United States Patent Office 3,340,273
Patented Sept. 5, 1967

3,340,273
ORGANOMERCURIC IMIDES OF POLYHALO-
POLYHYDROALKANONAPHTHALENEDICAR-
BOXYLIC ACIDS
Charles M. Hayes, Hoffman Estates, Ill., assignor to Universal Oil Products Company, Des Plaines, Ill., a corporation of Delaware
No Drawing. Filed June 23, 1965, Ser. No. 466,447
11 Claims. (Cl. 260—326)

This invention relates to novel compositions of matter and particularly to new compounds which possess fungicidal properties. More specifically still, the invention is concerned with new compounds comprising organomercuric imides of polyhalopolyhydroalkanonaphthalenedicarboxylic acids.

With the advent of compounds which possess pestiologically active properties, the term "pestiologically active" as used in the present specification will refer to compounds which possess fungicidal, bacteriacidal, insecticidal, etc., properties, it has been discovered that certain insects, bacteria, fungi, etc., are becoming resistant to compounds which heretofore have been used, therefore, it is necessary to find new compounds which will possess the desirable characteristics and which will be effective in combatting pests, either of animal or vegetable origin. For example, it has been found that flies are developing a resistance to DDT. Other insects are also developing a high resistance to this and other compounds which heretofore have been used with great effectiveness. According to the present invention, it has now been discovered that new compounds which possess fungicidal properties may be prepared by alkylating an alkali metal salt of an imide of a polyhalopolyhydroalkanonaphthalenedicarboxylic acid with an organomercuric halide. It is to be understood that the term "polyhalopolyhydroalkanonaphthalenedicarboxylic acids" as used in the present specification and appended claims also refer to these acids which possess a polyhalopolyhydrodialkanonaphthalenedicarboxylic acid configuration.

It is therefore an object of this invention to provide novel compositions of matter which possess desirable fungicidal activity.

A further object of this invention is to provide fungicidal compositions of matter which comprise organomercuric imides of polyhalopolyhydroalkanonaphthalenedicarboxylic acids and carriers therefor.

One embodiment of this invention resides in a compound selected from the group consisting of compounds containing the generic formula:

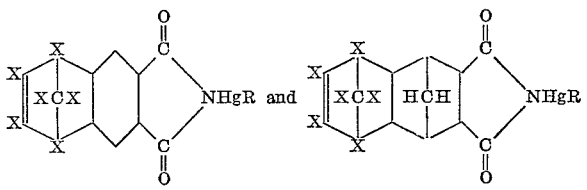

in which X is selected from the group consisting of hydrogen and halogen radicals, at least two X's being halogen, and R is selected from the group consisting of alkyl, cycloalkyl, thioalkyl, aminoalkyl, haloalkyl and aryl radicals.

A further embodiment of this invention is found in an alkylmercuric imide of a polyhalopolyhydroalkanonaphthalenedicarboxylic acid.

A specific embodiment of this invention resides in the ethylmercuric imide of 5,6,7,8,9,9-hexachloro-1,2,3,4,4a, 5,8,8a - octahydro-5,8-methano-2,3-naphthalenedicarboxylic acid.

Another specific embodiment of this invention is found in a fungicidal composition of matter comprising the phenylmercuric imide of 5,6,7,8,9,9-hexachloro-1,2,3,4,4a, 5,8,8a - octahydro-5,8-methano-2,3-naphthalenedicarboxylic acid and a carrier therefor.

Other objects and embodiments will be found in the following further detailed description of this invention.

As hereinbefore set forth, the present invention is concerned with novel compositions of matter comprising organomercuric imides of a polyhalopolyhydroalkanonaphthalenedicarboxylic acid or organomercuric imides of a polyhalopolyhydrodialkanonaphthalenedicarboxylic acid. These novel compositions of matter which may be represented by the generic formula:

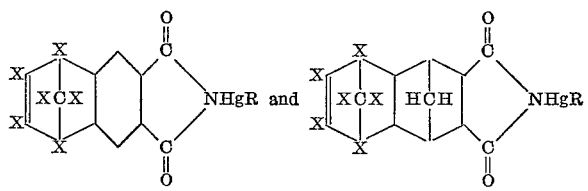

in which X is selected from the group consisting of hydrogen and halogen radicals, at least two X's being halogen, and R is selected from the group consisting of alkyl, cycloalkyl, thioalkyl, aminoalkyl, haloalkyl and aryl radicals, may be prepared in the manner hereinafter set forth in greater detail. In the preferred embodiment of the invention, the halogen radicals will possess an atomic weight of from 35 to 127 (i.e. chlorine, bromine and iodine) although it is also contemplated within the scope of this invention that one or more of the halogen substituents may comprise a fluorine radical, although not necessarily with equivalent results. The novel compositions of matter may be prepared by condensing a conjugated aliphatic diene with an olefinic dicarboxylic acid or anhydride thereof, the latter compound comprising the preferred reactant. Examples of conjugated aliphatic dienes which may be used include 1,3-butadiene, 2-methyl-1,3-butadiene, 1,3-pentadiene, 2-methyl-1,3-pentadiene, etc.; olefinic dicarboxylic acids or anhydrides thereof which may be used include maleic acid, maleic anhydride, fumaric acid, etc. The condensation which is of the Diels-Alder type reaction will take place at an elevated temperature in the range of from about 80° to about 250° C. or more and at a pressure ranging from atmospheric up to about 100 atmospheres or more, said pressure being sufficient to maintain a major portion of the reactants in the liquid phase. The tetrahydrophthalic acid or anhydride thereof which results from the aforementioned condensation is then further condensed with a conjugated halocycloalkadiene in a second Diels-Alder type reaction to form the desired acid or anhydride. Examples of halo-substituted cycloalkadienes which may be used include dichlorocyclopentadiene, trichlorocyclopentadiene, tetrachlorocyclopentadiene, pentachlorocyclopentadiene, hexachlorocyclopentadiene, dibromocyclopentadiene, tribromocyclopentadiene, tetrabromocyclopentadiene, pentabromocyclopentadiene, hexabromocyclopentadiene, diiodocyclopentadiene, triiodocyclopentadiene, tetraiodocyclopentadiene, pentaiodocyclopentadiene, hexaiodocyclopentadiene, etc. This second condensation reaction is also effected at elevated temperatures in a range of from about 50° to about 250° C. or more at pressures ranging from atmospheric up to about 100 atmospheres or more, the pressure again being sufficient so as to maintain a major portion of the reactants in the liquid phase at the reaction temperature.

Examples of polyhalopolyhydromethanonaphthalenedicarboxylic acids or anhydrides thereof which are prepared according to this method include 5,6,7,8,9,9-hexachloro-1,2,3,4,4a,5,8,8a - octahydro - 5,8-methano-2,3-naphthalenedicarboxylic acid, 5,6,7,8,9,9-hexachloro-1,2,3,4,4a,5, 8,8a - octahydro-5,8-methano-2,3-naphthalenedicarboxylic anhydride, 5,6,7,8,9,9-hexabromo-1,2,3,4,4a,5,8,8a-octahydro-5,8-methano-2,3-naphthalenedicarboxylic acid, 5,6,7,8,9,9-hexaiodo-1,2,3,4,4a,5,8,8a-octahydro-5,8-methano-2,3-napthalenedicarboxylic acid, etc.

As will be noted, the above process will result in the obtention of a polyhalo-substituted polyhalomethanonaphthalenedicarboxylic acid or anhydride. In the event that the acid or anhydride which contains a methano bridge in each ring is a desired product, it may be prepared in a similar manner by condensing a conjugated cycloalkadiene such as 1,3-cyclopentadiene with an olefinic dicarboxylic acid or anhydride thereof such as maleic acid, maleic anhydride, fumaric acid, etc., in a Diels-Alder condensation, the temperatures and pressures similar to those hereinabove set forth. The resulting polycyclic acid or anhydride such as norborn-5-ene-2,3-dicarboxylic acid or anhydride thereof is then further condensed with the conjugated halocycloalkadiene of the type also hereinabove set forth in a second Diels-Alder type reaction, the elevated temperatures ranging from about 50° up to about 250° C., the preferred range being from atmospheric up to about 100 atmospheres or more and being sufficient to maintain a major portion of the reactants in the liquid phase at the reaction temperature. In the present method of preparing the halo-substituted polyhydromethano- or dimethanonaphthalenedicarboxylic acid or anhydride thereof, the various Diels-Alder condensations which have been referred to are effected in the presence of a substantially inert organic solvent including aromatic solvents such as benzene, toluene, o-xylene, m-xylene, p-xylene, ethylbenzene, etc., or saturated paraffins and cycloparaffins such as n-pentane, n-hexane, n-heptane, cyclopentane, methylcyclopentane, cyclohexane, cycloheptane, etc. Generally speaking, when utilizing such a solvent, the condensations are preferably effected at the reflux temperature of the particular solvent which is utilized and therefore superatmospheric pressures are usually not required.

Examples of polyhalo-substituted polyhydrodimethanonaphthalenedicarboxylic acids which may be prepared include 5,6,7,8,9,9-hexachloro-1,2,3,4,4a,5,8,8a-octahydro-1,4,5,8-dimethano-2,3-naphthalenedicarboxylic acid, 5,6,7,8,9,9 - hexachloro-1,2,3,4,4a,5,8,8a-octahydro-1,4,5,8-dimethano-2,3-naphthalenedicarboxylic anhydride, 5,6,7,8,9,9 - hexabromo - 1,2,3,4,4a,5,8,8a-octahydro-1,4,5,8-dimethano-2,3-naphthalenedicarboxylic acid, 5,6,7,8,9,9-hexaiodo - 1,2,3,4,4a,5,8,8a-octahydro-1,4,5,8-dimethano-2,3-naphthalenedicarboxylic acid, etc. It is to be understood that the aforementioned compounds are only representative of the class of compounds which may be prepared and that the present invention is not necessarily limited thereto.

The aforementioned polyhalo - substituted polyhydromethano- or dimethanonaphthalenedicarboxylic acids or anhydrides thereof are condensed with an amine such as ammonia at temperatures ranging from about 50° to about 250° C. or more in the presence of a substantially inert organic solvent, the particular reaction temperature being dependent upon the solvent in which the condensation is effected. Usually, the condensation is effected at the reflux temperature of the solvent. In addition, the reaction time will be dependent to some extent of the particular temperature which is employed and will usually range from about one-half hour to about five hours or more. Examples of substantially inert organic solvents which may be used include aromatic hydrocarbons such as benzene, toluene, o-xylene, m-xylene, p-xylene, ethylbenzene; aliphatic paraffinic hydrocarbons such as n-pentane, n-hexane, n-heptane or cycloparaffins such as cyclopentane, cyclohexane, methylcyclopentane, etc. When condensing the acid or anhydride with ammonia, it is necessary to control the temperature of the reaction inasmuch as the condensation is usually exothermic in nature. For example, ammonia or an amino compound is placed in an appropriate reaction vessel along with the desired solvent and the acid or anhydride thereof is slowly added thereto. To control the exothermicity of the reaction, the amino compound may be cooled prior to the action of the acid or the anhydride and the rise in temperature controlled by utilization of any external cooling means such as an ice bath. Upon completion of the addition of the acid or anhydride, the reaction mixture may be heated to the reaction temperature of the solvent and maintained thereat for a predetermined residence time. The reaction vessel which is utilized for the process of this invention is provided with means for removing the water which is formed during the reaction. Upon completion of the desired residence time, which is evidenced by the removal of the theoretical amount of water the reaction mixture is allowed to cool to room temperature. Following this, the solvent may be removed by distillation which is thereafter followed by removal of the excess amino compound. In this respect, it should be noted that the amino compound such as ammonia, ammonium hydroxide, ammonium carbonate, etc., is usually present in the reaction mixture in a ratio of from about 1.5 up to about 10 moles of amino compound per mole of anhydride. The resulting imide of the polyhalo-substituted polyhydromethanonaphthalenedicarboxylic acid is thereafter converted to the alkali salt of the imide by treating said imide with an alkali material such as sodium hydroxide, potassium hydroxide, lithium hydroxide, sodium carbonate, potassium carbonate, lithium carbonate, etc. Following this, the desired compound of the present invention is then obtained by reacting the alkali metal salt such as the potassium, sodium or lithium salt of the imide with an organomercuric halide. Examples of these organomercuric halides which may be used include ethylmercuric chloride, propylmercuric chloride, butylmercuric chloride, ethylmercuric bromide, propylmercuric bromide, butylmercuric bromide, phenylmercuric chloride, benzylmercuric chloride, tolylmercuric chloride, tolylmercuric bromide, xylylmercuric chloride, xylylmercuric bromide, ethylthiomercuric chloride, propylthiomercuric chloride, butylthiomercuric chloride, ethylthiomercuric bromide, propylthiomercuric bromide, butylthiomercuric bromide, p-chlorophenylmercuric chloride, o-chlorophenylmercuric chloride, m-chlorophenylmercuric chloride, o-bromophenylmercuric chloride, m-bromophenylmercuric chloride, p-bromophenylmercuric chloride, p-chlorophenylmercuric bromide, o-chlorophenylmercuric bromide, m-chlorophenylmercuric bromide, o-bromophenylmercuric bromide, m-bromophenylmercuric bromide, p-bromophenylmercuric bromide, etc. It is to be understood that the aforementioned organomercuric halides are only representative of the class of compounds which may be used and that the process of the present invention is not necessarily limited thereto.

The desired compounds are prepared by, as hereinbefore set forth, condensing equimolar proportions of the alkali metal salt of the imide of the polyhalopolyhydromethanonaphthalenedicarboxylic acid and the organomercuric halide at ambient temperature and at atmospheric pressures in the presence of a substantially inert organic solvent. The condensation is allowed to proceed for a period of time ranging from about 1 to about 10 hours or more, following which the resulting organomercuric imide of the acid is recovered by conventional means such as filtration, recrystallization, etc.

Examples of the desired products comprising novel compositions of matter include the methylmercuric imide of 5,6,7,8 - tetrachloro - 1,2,3,4,4a,5,8,8a - octahydro - 5,8-methano - 2,3 - naphthalenedicarboxylic acid, the ethylmercuric imide of 5,6,7,8-tetrachloro-1,2,3,4,4a,5,8,8a-octahydro-5,8-methano-2,3-naphthalenedicarboxylic acid, the propylmercuric imide of 5,6,7,8 - tetrachloro - 1,2,3,4,4a,5,8,8a - octahydro - 5,8 - methano - 2,3 - naphthalenedicarboxylic acid, the methylmercuric imide of 5,6,7,8,9, - hexachloro - 1,2,3,4,4a,5,8,8a - octahydro - 5,8-methano - 2,3 -naphthalenedicarboxylic acid, the ethylmercuric imide of 5,6,7,8,9,9 - hexachloro - 1,2,3,4,4a,5, 8,8a - octahydro - 5,8 - methano - 2,3 - naphthalenedicarboxylic acid, the propylmercuric imide of 5,6,7,8,9,9-hexachloro - 1,2,3,4,4a,5,8,8a - octahydro - 5,8 - methano-2,3 - naphthalenedicarboxylic acid, the methylmercuric imide of 5,6,7,8 - tetrachloro - 1,2,3,4,4a,5,8,8a - octahydro - 1,4,5,8 - dimethano - 2,3 - naphthalenedicarboxylic acid, the ethylmercuric imide of 5,6,7,8 - tetrachloro - 1,2,3,4,4a,5,8,8a - octahydro - 1,4,5,8 - dimethano - 2,3-naphthalenedicarboxylic acid, the propylmercuric imide of 5,6,7,8 - tetrachloro - 1,2,3,4,4a,5,8,8a - octahydro-1,4,5,8 - dimethano - 2,3 - naphthalenedicarboxylic acid, the methylmercuric imide of 5,6,7,8,9,9 - hexachloro-1,2,3,4,4a,5,8,8a - octahydro - 1,4,5,8 - dimethano - 2,3-naphthalenedicarboxylic acid, the ethylmercuric imide of 5,6,7,8,9,9 - hexachloro - 1,2,3,4,4a,5,8,8a - octahydro-1,4,5,8 -dimethano - 2,3 - naphthalenedicarboxylic acid, the propylmercuric imide of 5,6,7,8,9,9 - hexachloro - 1, 2,3,4,4a,5,8,8a - octahydro - 1,4,5,8 - dimethano - 2,3-naphthalenedicarboxylic acid, the phenylmercuric imide of 5,6,7,8 - tetrachloro - 1,2,3,4,4a,5,8,8a - octahydro-5,8 - methano - 2,3 - naphthalenedicarboxylic acid, the phenylmercuric imide of 5,6,7,8,9,9 - hexachloro - 1,2,3, 4,4a,5,8,8a - octahydro - 5,8 - methano - 2,3 - naphthalenedicarboxylic acid, the phenylmercuric imide of 5,6, 7,8 - tetrachloro - 1,2,3,4,4a,5,8,8a - octahydro - 1,4,5,8-dimethano - 2,3 - naphthalenedicarboxylic acid, the phenylmercuric imide of 5,6,7,8,9,9, - hexachloro - 1,2,3,4,4a, 5,8,8a - octahydro - 1,4,5,8 - dimethano - 2,3 - naphthalenedicarboxylic acid, the ethylthiomercuric imide of 5,6, 7,8,9,9 - hexachloro - 1,2,3,4,4a,5,8,8a - octahydro - 5,8-methano - 2,3 - naphthalenedicarboxylic acid, the cyclohexyl imide of 5,6,7,8 - tetrachloro - 1,2,3,4,4a,5,8,8a-octahydro - 5,8 - methano - 2,3 - naphthalenedicarboxylic acid, the cyclohexyl imide of 5,6,7,8 - tetrachloro - 1,2,3, 4,4a,5,8,8a - octahydro - 1,4,5,8 - dimethano - 2,3 - naphthalenedicarboxylic acid, etc. The aforementioned novel compositions of matter are only representative of the class of compounds which may be prepared and the present invention is not necessarily limited thereto.

As hereinbefore set forth, these novel compositions of matter, due to the particular configuration of the molecule, possess many desirable characteristics for use as pestiologically active compounds. For example, the compounds are readily soluble in many of the organic solvents such as acetone, dioxane, ketones, etc., as well as being soluble in alcohols such as methyl alcohol, ethyl alcohol, isopropyl alcohol, etc. The compounds can be used as dusts, emulsifiable concentrates or wettable powders, the active ingredient being composited with a suitable carrier comprising an inert substance. In addition to possessing excellent fungicidal properties, especially against scab, smut, seedling blight or seed decay, the compounds are exceedingly stable and will not tend to decompose and therefore lose their effectiveness as fungicidal, bacteriacidal or pesticidal agents. This ability to remain stable will be of great importance inasmuch as the retention time on the crops, etc., will be lengthened and therefore a relatively lesser amount of the compounds will be required overall.

The following examples are given to illustrate the process of the present invention, which however, are not intended to limit the generally broad scope of the present invention in strict accordance therewith.

*Example I*

In this example, 5,6,7,8,9,9 - hexachloro - 1,2,3,4,4a, 5,8,8a - octahydro - 5,8 - methano - 2,3 - naphthalenedicarboxylic anhydride is prepared by condensing 1,3-butadiene with maleic anhydride at a temperature in the range of from about 80° to about 250° C. in the presence of benzene. The resulting tetrahydrophthalic anhydride is further condensed with hexachlorocyclopentadiene at a similar temperature in the presence of benzene in a Diels-Alder type reaction to form the desired anhydride.

The imide of the anhydride is then prepared by condensing the anhydride prepared according to the above paragraph with ammonium carbonate monohydrate, the latter compound being present in a mole ratio of about 2 moles of ammonium carbonate per mole of anhydride. The reaction is effected by heating the reactants to fusion, thereafter cooling the fused mixture and dissolving in an organic solvent such as benzene. The desired imide is recovered by recrystallization on cooling.

The desired alkali metal salt of the imide is then prepared by dissolving an alkali metal hydroxide such as potassium hydroxide in methyl alcohol and adding the solution to a boiling solution of the imide which has been dissolved in dioxane. Following this, the resulting solution is cooled to room temperature and the desired potassium salt of the imide of 5,6,7,8,9,9 - hexachloro - 1,2,3,4,4a, 5,8,8a - octahydro - 5,8 - methano - 2,3 - naphthalenedicarboxylic acid is recovered.

*Example II*

A dimethano anhydride similar in nature to the monomethano anhydride prepared according to Example I is prepared by admixing hexachlorocyclopentadiene and norborn - 5 -ene - 2,3 - dicarboxylic anhydride along with xylene in a condensation flask. The mixture is heated to a temperature of about 165° C. and maintained thereat for a period of about 4 hours. At the end of this time, the mixture is allowed to cool to room temperature, the crystallized precipitate forming upon standing. The mixture is filtered and the crystals are recovered by recrystallization from a ketone solution such as methylisobutyl ketone, the recrystallized produce comprising 5,6,7,8,9,9-hexachloro - 1,2,3,4,4a,5,8,8a - octahydro - 1,4,5,8 - dimethano - 2,3 - naphthalenedicarboxylic anhydride.

The desired alkali salt of the imide of this 1,4,5,8-dimethylnaphthalenedicarboxylic anhydride is prepared in a manner similar to that set forth in Example I above. The anhydride formed is reacted with ammonium carbonate at elevated temperatures sufficient to fuse the mixture and after being fused, the mixture is cooled and dissolved in boiling xylene. Upon cooling, the imide will crystallize out. The potassium salt of the imide is then prepared by reacting a solution of potassium hydroxide in ethyl alcohol with a boiling solution of the imide dissolved in acetone. The resulting solution which contains the desired potassium salt of the imide of 5,6,7,8,9,9 - hexachloro-1,2,3,4,4a,5,8,8a - octahydro - 1,4,5,8 - dimethano - 2,3-naphthalenedicarboxylic acid is cooled to room temperature and recovered.

*Example III*

To obtain the desired organomercuric imide of the polyhalopolyhydroalkanonaphthalenedicarboxylic acid, equimolar proportions of the potassium salt of the imide of 5,6,7,8,9,9 - hexachloro - 5,8 - methano - 2,3-naphthalenedicarboxylic acid and ethylmercuric bromide are reacted. The potassium salt which is dissolved in an organic solvent such as dioxane has added thereto the ethylmercuric bromide and the resulting reaction mixture is allowed to stand at room temperature (approximately 25° C.) for a period of about 24 hours. The solid which precipitates out is recovered by concentration of the dioxane solution and after recrystallization, the desired product comprises the ethylmercuric imide of 5,6,7,8,9,9-hexachloro - 1,2,3,4,4a,5,8,8a - octahydro - 5,8 - methano-2,3 - naphthalenedicarboxylic acid which is a white crystalline material is separated and recovered.

*Example IV*

In this example, the ethylmercuric imide of 5,6,7,8,9,9-hexachloro - 1,2,3,4,4a,5,8,8a - octahydro - 1,4,5,8 - dimethano-2,3-naphthalenedicarboxylic acid is prepared by dissolving a molecular proportion of the potassium salt of the imide of 5,6,7,8,9,9-hexachloro-1,2,3,4,4a,5,8,8a-octahydro - 1,4,5,8 - dimethano - 2,3-naphthalenedicarboxylic acid in anhydrous acetone and adding thereto a molecular proportion of ethylmercuric bromide. The reaction mixture is then placed in a flask provided with a reflux condensor and heated to the reflux temperature of the acetone. The resulting solution is refluxed for a period of 3 hours following which a major portion of the acetone solvent is removed by distillation. The residue is recrystallized from hexane and the desired product comprising the ethylmercuric imide of 5,6,7,8,9,9-hexachloro-1,2,3,4,4a, 5,8,8a-octahydro-1,4,5,8-dimethano - 2,3 - naphthalenedicarboxylic acid is recovered.

*Example V*

In this example, the potassium salt of the imide of 5,6,7,8,9,9 - hexachloro - 1,2,3,4,4a,5,8,8a-octahydro-5,8-methano-2,3-naphthalenedicarboxylic acid is dissolved in dioxane and an equimolar proportion of phenylmercuric chloride is added thereto. The reaction mixture is allowed to remain at room temperature for a period of about 48 hours following which the solid which has precipitated out during the residence time is recovered. The solid is recrystallized from an organic solvent and the desired product comprising the phenylmercuric imide of 5,6,7,8,9,9-hexachloro - 1,2,3,4,4a,5,8,8a-octahydro-5,8-methano-2,3-naphthalenedicarboxylic acid is recovered.

*Example VI*

A molecular proportion of the potassium salt of the imide of 5,6,7,8,9,9 - hexachloro-1,2,3,4,4a,5,8,8a-octahydro-1,4,5,8-dimethano-2,3-naphthalenedicarboxylic acid is dissolved in dioxane and an equimolar proportion of phenylmercuric bromide is added thereto. The resulting mixture is allowed to remain at room temperature for a period of about 48 hours during which time a white solid will precipitate out. This precipitate is filtered and recrystallized from acetone, the final crystals, comprising the phenylmercuric imide of 5,6,7,8,9,9-hexachloro-1,2,3, 4,4a,5,8,8a-octahydro-1,4,5,8-dimethano - 2,3 - naphthalenedicarboxylic acid being separated and recovered.

*Example VII*

In this example, the ethylthiomercuric imide of 5,6,7,8, 9,9-hexachloro-1,2,3,4,4a,5,8,8a-octahydro-5,8 - methano-2,3-naphthalenedicarboxylic acid is prepared in the manner similar to that set forth in the above examples, by reacting equimolar proportions of the potassium salt of the imide of 5,6,7,8,9,9-hexachloro-1,2,3,4,4a,5,8,8a-octahydro-5,8-methano-2,3-naphthalenedicarboxylic acid dissolved in acetone and the ethylthiomercuric bromide. After allowing the reaction mixture to remain at room temperature for a period of about 48 hours the solid which has precipitated out is recovered and recrystallized the finished product comprising the ethylthiomercuric imide of 5,6,7,8,9,9 - hexachloro-1,2,3,4,4a,5,8,8a-octahydro-5,8-methano-2,3-naphthalenedicarboxylic acid.

*Example VIII*

To illustrate the fungicidal activity of the products of the present invention, a fungicidal composition of matter is prepared by dissolving 1 gram of the ethylmercuric imide of 5,6,7,8,9,9 - hexachloro-1,2,3,4,4a,5,8,8a-octahydro-5,8-methano-2,3-naphthalenedicarboxylic acid in 2 cc. of dioxane and adding the resultant solution to 100 cc. of water using Triton X–100 as the emulsifying agent. The solution is sprayed on cereal plants such as wheat, rye, etc., and will demonstrate fungicidal activity against mildews as well as spore germination of various fungi. Other fungicidal compositions of matter utilizing the organomercuric imides of the acids which have been prepared according to Examples III to VII above, when composited with a like carrier and sprayed on cereal such as wheat, will exhibit like properties.

I claim as my invention:

1. A compound selected from the group consisting of compounds containing the formula:

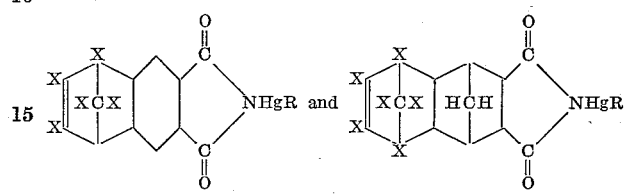

in which X is selected from the group consisting of hydrogen and halogen, at least two X's being halogen, and R is selected from the group consisting of alkyl, thioalkyl, aminoalkyl and haloalkyl in which the alkyls contain from 1 to 4 carbon atoms, phenyl, halophenyl, benzyl, tolyl, xylyl and cyclohexyl.

2. A compound as defined in claim 1 further characterized in that R is alkyl containing from 1 to 4 carbon atoms.

3. A compound as defined in claim 2 further characterized in that the compound contains only one methano bridge.

4. A compound as defined in claim 1 further characterized in that R is phenyl.

5. A compound as defined in claim 4 further characterized in that the compound contains only one methano bridge.

6. A compound as defined in claim 1 further characterized in that R is thioalkyl containing from 1 to 4 carbon atoms.

7. The ethylmercuric imide of 5,6,7,8,9,9-hexachloro-1,2,3,4,4a,5,8,8a - octahydro - 5,8 - methano-2,3-naphthalenedicarboxylic acid.

8. The ethylmercuric imide of 5,6,7,8,9,9-hexachloro-1,2,3,4,4a,5,8,8a-octahydro-1,4,5,8-dimethano-2,3 - naphthalenedicarboxylic acid.

9. The phenylmercuric imide of 5,6,7,8,9,9-hexachloro-1,2,3,4,4a,5,8,8a - octahydro - 5,8 - methano-2,3-naphthalenedicarboxylic acid.

10. The phenylmercuric imide of 5,6,7,8,9,9 - hexachloro - 1,2,3,4,4a,5,8,8a - octahydro - 1,4,5,8-dimethano-2,3-naphthalenedicarboxylic acid.

11. The ethylthiomercuric imide of 5,6,7,8,9,9-hexachloro - 1,2,3,4,4a,5,8,8a - octahydro - 5,8 - methano-2,3-naphthalenedicarboxylic acid.

References Cited

UNITED STATES PATENTS

| | | | |
|---|---|---|---|
| 2,087,960 | 7/1937 | Andersen | 260—396 |
| 2,598,562 | 5/1952 | Kleiman | 260—326 |
| 2,781,360 | 2/1957 | Kleiman | 260—326 |

ALEX MAZEL, *Primary Examiner.*

MARY O'BRIEN, JOSEPH A. NARCAVAGE,
*Assistant Examiners.*